UNITED STATES PATENT OFFICE.

E. E. MARCY, OF NEW YORK, N. Y.

IMPROVEMENT IN VULCANIZING ELASTIC GUM.

Specification forming part of Letters Patent No. 11,897, dated November 7, 1854.

*To all whom it may concern:*

Be it known that I, E. E. MARCY, physician and chemist, of the city of New York, State of New York, have discovered and invented a new and useful Mode or Treatment of India-Rubber, by which I dispense with sulphur and produce a fabric which will not be affected by extremes of temperature, very durable, not liable to bloom, and free from offensive smell, of which the following is a specification.

To enable persons skilled in the manufacture of india-rubber to make the same, I declare the following as the best mode known to me.

I reduce selenium to a powder and take twenty to one hundred parts of this compound and combine with one hundred, by weight, of rubber, and then proceed as with any other compound of rubber to be cured in steam. By this means I produce a good quality of vulcanized india-rubber, applicable to all purposes where elasticity and great strength are required. Where very little elasticity is required, and where a glossy finish is desirable on the fabric, I add to the rubber and selenium carbonate or chromate of lead and whiting, and expose it to heated air. By this latter process the lead acts with the selenium to effect the change. Other modes may be resorted to in the details; but in all the selenium is indispensable and forms the distinguishing character or feature of my invention.

Having for the purpose of enabling persons skilled in the art of manufacturing india-rubber described the best mode known to me of manufacturing under my improvement, what I claim, and desire to secure by Letters Patent as my discovery and invention, is—

The combination of selenium with india-rubber as a curing or vulcanizing agent.

In witness whereof, &c.

E. E. MARCY.

Witnesses:
HORACE H. DAY,
JAMES WALDRON.